US011851198B2

(12) United States Patent
Gajanayake et al.

(10) Patent No.: US 11,851,198 B2
(45) Date of Patent: Dec. 26, 2023

(54) ELECTRICALLY PROPELLED AIRCRAFT WITH PARTIALLY RATED CONVERTER (71) Applicants: Rolls-Royce Singapore Pte. Ltd., Singapore (SG); Rolls-Royce Corporation, Indianapolis, IN (US)

(72) Inventors: Chandana Jayampathi Gajanayake, Singapore (SG); David Russell Trawick, Indianapolis, IN (US)

(73) Assignees: Rolls-Royce Singapore Pte. Ltd., Singapore (SG); Rolls-Royce Corporation, Indianapolis, IN (US)

(*) Notice: Subject to any disclaimer, the term of this patent is extended or adjusted under 35 U.S.C. 154(b) by 0 days.

(21) Appl. No.: 17/660,905

(22) Filed: Apr. 27, 2022

(65) Prior Publication Data
US 2023/0348079 A1    Nov. 2, 2023

(51) Int. Cl.
*B64D 27/24* (2006.01)
*H02J 7/34* (2006.01)

(52) U.S. Cl.
CPC .............. *B64D 27/24* (2013.01); *H02J 7/342* (2020.01); *B64D 2221/00* (2013.01); *H02J 2310/44* (2020.01)

(58) Field of Classification Search
None
See application file for complete search history.

(56) References Cited

U.S. PATENT DOCUMENTS

| 9,685,797 | B2 | 6/2017 | Tofigh et al. |
| 9,925,889 | B2 | 3/2018 | Hao et al. |
| 2005/0194937 | A1 | 9/2005 | Jacobs |
| 2008/0143292 | A1* | 6/2008 | Ward ...................... B60L 8/003 320/101 |
| 2018/0134400 | A1* | 5/2018 | Knapp ................. G08G 5/0052 |
| 2021/0078714 | A1* | 3/2021 | Demont ................ H01M 50/35 |

FOREIGN PATENT DOCUMENTS

| EP | 3893359 A1 | 10/2021 |
| KR | 20190058907 A | 5/2019 |
| KR | 20200085075 A | 7/2020 |
| WO | 2015016967 A1 | 2/2015 |

OTHER PUBLICATIONS

Search Report from counterpart British Application No. 2305493.5 dated Oct. 13, 2023, 3 pp.

* cited by examiner

*Primary Examiner* — Jared Fureman
*Assistant Examiner* — Aqeel H Bukhari
(74) *Attorney, Agent, or Firm* — Shumaker & Sieffert, P.A.

(57) ABSTRACT

An example system includes an electrical energy storage system (ESS) comprising: an upper node and a lower node; a first set of battery modules that are connected in series; a second set of battery modules that are connected in series; a DC/DC converter electrically in series with the first set of battery modules between the upper node and the lower node, wherein the DC/DC converter sources electrical energy from the second set of battery modules; and a controller configured to adjust an output voltage of the DC/DC converter such that a voltage across the upper node and the lower node is maintained at a specified output voltage level.

20 Claims, 12 Drawing Sheets

ELECTRICALLY PROPELLED AIRCRAFT WITH PARTIALLY RATED CONVERTER

TECHNICAL FIELD

This disclosure relates to aircraft electric or hybrid-electric propulsion systems.

BACKGROUND

Aircraft may be powered by various propulsors (e.g., fans or propellers), which may be driven by various motors. In electric aircraft, an electric motor may drive the propulsors using electrical energy sourced from an electrical energy storage system (ESS) that includes one or more batteries.

SUMMARY

In general, this disclosure describes aircraft propulsion systems that include electrical energy storage systems (ESSs) with partially rated converters. An ESS may include a plurality of batteries electrically connected in series, and a power converter (e.g., a DC/DC power converter) that converts DC electrical energy sourced from the plurality of batteries in series into DC electrical energy (e.g., at a different voltage) for output onto a DC electrical bus. In such cases, the converter may be considered to be a fully rated converter. For instance, the converter may be rated (e.g., capable of handling without adverse impact) for the maximum voltage of the plurality of batteries. In other words, if a voltage across a series-connected plurality of batteries of an ESS is 2 kilovolts (kV), a fully rated converter of the ESS may be capable of receiving an input signal of at least 2 kV. Including a relatively high voltage rated converter may present one or more disadvantages. As one example, a rating of a converter may be positively correlated with a weight of the controller. As such, converters that are rated for higher voltages may weigh more than converters rated for lower voltages. As another example, higher voltage rated converters may also have higher conduction and/or switching losses, which may not be desirable. As another example, higher voltage rated converters may use higher switching energy that may increase losses and prevent high frequency operation, thereby increasing inductor weight (e.g., to enable operation at lower frequencies). However, it may be desirable to minimize weight and/or energy consumption of an ESS.

In accordance with one or more aspects of this disclosure, an aircraft may include an ESS with a partially rated converter. For instance, an ESS may include an upper node and a lower node; a first set of battery modules that are connected in series; a second set of battery modules that are connected in series; a DC/DC converter electrically in series with the first set of battery modules between the upper node and the lower node, wherein the DC/DC converter sources electrical energy from the second set of battery modules; and a controller configured to adjust an output voltage of the DC/DC converter such that a voltage across the upper node and the lower node is maintained at a specified output voltage level. The converter may be rated to a voltage level that is less than the specified output voltage level. By enabling the use of a converter that is rated less than the output voltage level, this disclosure enables a desirable reduction in weight of the ESS.

In one example, a system includes an ESS comprising: an upper node and a lower node; a first set of battery modules that are connected in series; a second set of battery modules that are connected in series; a DC/DC converter electrically in series with the first set of battery modules between the upper node and the lower node, wherein the DC/DC converter sources electrical energy from the second set of battery modules; and a controller configured to adjust an output voltage of the DC/DC converter such that a voltage across the upper node and the lower node is maintained at a specified output voltage level.

The details of one or more examples are set forth in the accompanying drawings and the description below. Other features, objects, and advantages will be apparent from the description and drawings, and from the claims.

DETAILED DESCRIPTION

Figure 1:
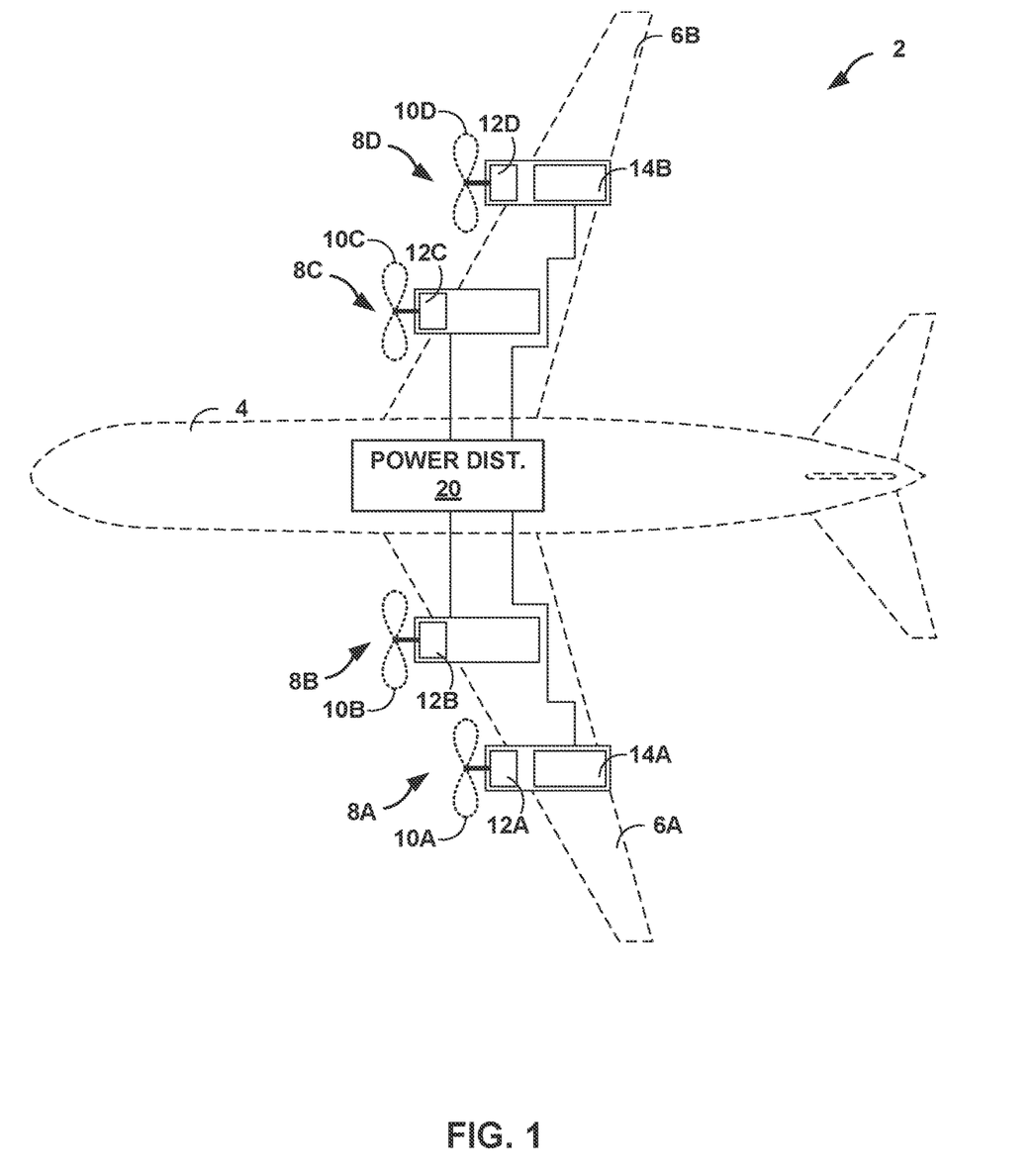
FIG. 1 is a conceptual block diagram illustrating an aircraft that includes an electrical propulsion system with an electrical energy storage system, in accordance with one or more aspects of this disclosure.

FIG. 1 is a conceptual block diagram illustrating an aircraft that includes fault tolerant electrical propulsion system, in accordance with one or more aspects of this disclosure. As shown in FIG. 1, aircraft 2 includes fuselage 4, port wing 6A, starboard wing 6B, nacelles 8A-8D (collectively, "nacelles 8"), and electrical energy storage systems (ESSs) 14A and 14B. Examples of aircraft 2 include, but are not limited to, fixed wing airplanes, tilt rotor aircraft, rotorcraft (e.g., eVTOL, helicopters, quadcopters, etc.), or any other flying machine propelled at least in part using electrically driven propulsors. Fuselage 4 may be a main body of aircraft 2 in which passengers and/or cargo are stored.

Nacelles 8 may include various components to support operation of aircraft 2. Nacelles 8 may be distributed on both port and starboard sides of aircraft 2. For instance, as shown in FIG. 1, nacelles 8A and 8B may be positioned on a port side of aircraft 2 (e.g., attached to port wing 6A) and nacelles 8C and 8D may be positioned on a starboard side of aircraft 2 (e.g., attached to starboard wing 6B). Nacelles 8 may be referred to by relative position. For instance, nacelles 8B and 8C may be referred to as inboard nacelles (e.g., as they are located closer to fuselage 4 than nacelles 8A and 8D). Similarly, nacelles 8A and 8D may be referred to as outboard nacelles (e.g., as they are located farther from fuselage 4 than nacelles 8B and 8C).

One or more of nacelles 8 may include propulsors configured to propel aircraft 2. For instance, as shown in FIG.

1, each of nacelles 8 may include a respective propulsor of propulsors 10A-10D (collectively, "propulsors 10") that is driven by a respective electric motor of electric motors 12A-12D (collectively, "electric motors 12"). Examples of propulsors 10 include, but are not limited to, fans, propellers (e.g., either fixed or variable pitch), and the like. Examples of electric motors 12 include, but are not limited to, brushed, brushless, alternating current (AC), direct current (DC), field-wound, permanent magnet, etc. Electric motors 12 may provide rotational energy to propulsors 10 using electrical energy source from one or more components of aircraft 2, such as ESS 14A or ESS 14B.

Aircraft 2 may include one or more electrical energy storage systems, such as ESS 14A and ESS 14B (collectively, "ESSs 14"). The ESSs 14 may be configured to store electrical energy for use by one or more components of aircraft 2, such as electric motors 12. Each of ESSs 14 may be connected to a respective electrical bus of a plurality of electrical busses. For instance, ESS 14A may be connected to, and configured to supply electrical energy to, a first electrical bus. Similarly, ESS 14B may be connected to, and configured to supply electrical energy to, a second electrical bus.

ESSs 14 may each include a plurality of battery modules and converters (e.g., DC/DC converters). In accordance with one or more aspects of this disclosure, a converter in an ESS of ESSs 14 may be a partially rated converter. For instance, a converter in ESS 14A may be rated for a maximum voltage that is less than an output voltage of ESS 14A and/or a combined voltage of battery modules of ESS 14A. To produce an output voltage that is greater than the rating of the converter, a first set of the battery modules of ESS 14A may be connected in series with the converter, which may source energy from a second set of the battery modules of ESS 14A (e.g., such that the output voltage may include at least a sum of the voltages of the battery modules in series with the converter and the output of the converter). By enabling the use of a converter that is rated less than the output voltage level, this disclosure enables a desirable reduction in weight of ESSs 14. Reducing weight of ESSs 14 may provide several advantages, such as increased range and/or payload capacity of aircraft 2.

Aircraft 2 may include protection and distribution components 20 ("PnD 20") that form portions of the electrical busses. PnD 20 may include various distribution panels and electrical cables that facilitate the transfer of electrical energy between components of aircraft 2 (e.g., electric motors 12 and ESSs 14). As one example, PnD 20 may include a first distribution panel for the first electrical bus and a second distribution panel for the second electrical bus. The first and second distribution panels may be located in fuselage 4. As another example, PnD 20 may include several electrical cables. For instance, PnD 20 may include electrical cables connecting ESSs 14 to the distribution panels, and electrical cables connecting the distribution panels to electric motors 12. As such, in some examples, all of the electrical energy provided by ESSs 14 and utilized by electric motors 12 may flow through the distribution panels.

While illustrated as including a plurality of ESSs and a plurality of electric motors, the techniques of this disclosure are not so limited. For instance, aircraft 2 may include a single ESS and a single motor, a single ESS and a plurality of motors, or a plurality of ESSs and a single motor.

Figure 2:
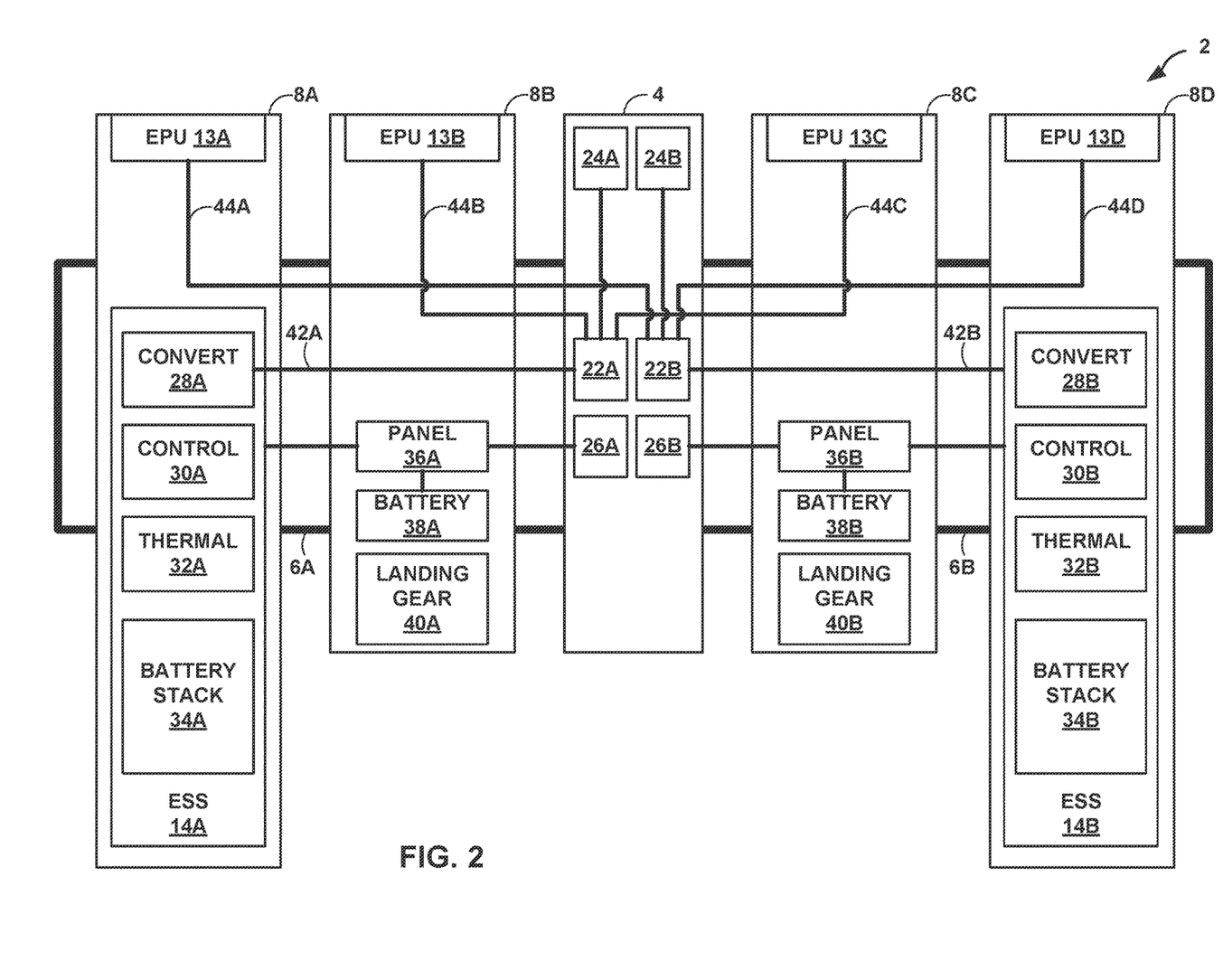
FIG. 2 is a conceptual block diagram illustrating a system that an electric propulsion system with an electrical energy storage system, in accordance with one or more aspects of this disclosure.

FIG. 2 is a system diagram illustrating further details of one example of aircraft 2 of FIG. 1, in accordance with one or more aspects of this disclosure. As shown in FIG. 2, each of nacelles 8 may include an electric propulsion unit (EPU) of EPUs 13A-13D (collectively, "EPUs 13"). Each of EPUs 13 may include components configured to propel aircraft 2 using electrical energy. For instance, each of EPUs 13 may include an electric motor and a propulsor (e.g., an electric motor of electric motors 12 and a propulsor of propulsors 10 of FIG. 1). In some examples, EPUs 13 may include additional components. For instance, where the electrical busses supplying EPUs 13 are direct current (DC) electrical busses and the electric motors are alternating current (AC) motors, EPUs 13 may each include an inverter configured to convert DC electrical energy into AC electrical energy.

ESSs 14, as shown in FIG. 2, may each include a respective converter of converters 28A and 28B (collectively, "converters 28"), a respective controller of controllers 30A and 30B (collectively, "controllers 30"), a respective thermal management system (TMS) of TMS 32A and 32B (collectively, "TMSs 32"), and a respective battery stack of battery stacks 34A and 34B (collectively, "battery stacks 34").

Converters 28 include components configured to convert electrical energy exchanged between battery stacks 34 and electrical busses. For instance, converter 28A may convert electrical energy between battery stack 34A and a first electrical bus and converter 28B may convert electrical energy between battery stack 34B and a second electrical bus. In some examples, to convert the electrical energy, converters 28 may adjust a voltage of the electrical energy. For instance, where the first electrical bus is a DC electrical bus (e.g., a 1080 volt DC electrical bus), converter 28A may include DC/DC converters configured to convert electrical energy between a voltage of battery stack 34A and a voltage of the first electrical bus. Converters 28 may be bi-directional in that converters 28 may convert electrical energy provided by battery stacks 34 for use by other components of aircraft 2 and convert electrical energy provided by other components of aircraft 2 (or sourced from components external to aircraft 2) for use in charging battery stacks 34.

Controllers 30 may be configured to control operation of ESSs 14. For instance, controller 30A may be considered a controller of a battery management system that controls operation of converter 28A, TMS 32A, and battery stack 34A.

TMSs 32 may include components configured to manage a thermal state of ESSs 14. For instance, each of TMSs 32 may include loops (e.g., heating and/or cooling) configured to manage a temperature of a corresponding ESS of ESSs 14. As one example, TMS 32A may include one or more temperature sensors configured to monitor a temperature of battery stack 34A, one or more pumps configured to pump coolant through battery stack 34A, one or more heaters configured to heat the coolant, and a controller that manages operation of the pumps and heaters based on the temperature of battery stack 34A. TMS 32B may include similar components for battery stack 34B.

Battery stacks 34 may each include a plurality of battery modules that store electrical energy to be used for propulsion of aircraft 2. The battery modules in battery stacks 34 may be any type of battery. Examples of batteries include, but are not limited to, lithium-ion, lead-acid, nickel-cadmium, nickel-metal hydride, lithium-ion polymer, or any other type of rechargeable battery (i.e., secondary cell). While illustrated in FIG. 2 as being entirely within the outboard nacelles, in some examples the batteries of battery stacks 34 may be distributed among inboard and outboard nacelles, or may be entirely within the inboard nacelles. That is, in one example, batteries of battery stack 34A may all be included in nacelle 8A and batteries of battery stack 34B may all be included in nacelle 8D. In another example, a first set of the batteries of battery stack 34A may be included in nacelle 8A, a second set of the batteries of battery stack 34A may be included in nacelle 8B, a first set of the batteries of battery stack 34B may be included in nacelle 8D, a second set of the batteries of battery stack 34B may be included in nacelle 8C. In another example, batteries of battery stack 34A may all be included in nacelle 8B and batteries of battery stack 34B may all be included in nacelle 8C.

Nacelles 8 may include one or more components configured to facilitate operation of battery stacks 34. As one example, outboard nacelles 8A and 8D may each include vents configured to transmit gasses or other particulate (e.g., smoke) from battery stacks 34 to outside of aircraft 2. As another example, outboard nacelles 8A and 8D may each include access panels that enable direct access to battery stacks 34 from outside of aircraft 2.

As discussed above, aircraft 2 may include one or more electrical busses. For instance, as shown in FIG. 2, aircraft 2 may include a respective propulsion bus for each ESS of ESSs 14. Each of the propulsion busses may be formed from various electrical cables and distribution panels. For instance, a first propulsion bus may be formed from cables and panels used to provide electrical energy to electric motors of outboard nacelles 8A and 8D, and a second propulsion bus may be formed from cables and panels used to provide electrical energy to electric motors of inboard nacelles 8B and 8C. As shown in FIG. 2, the first propulsion bus may include: electrical cables 42A connecting ESS 14A to distribution panel 22A, electrical cables 44B connecting distribution panel 22A to EPU 13B (e.g., to the electric motor of inboard nacelle 8B), and electrical cables 44C connecting distribution panel 22A to EPU 13C (e.g., to the electric motor of inboard nacelle 8C). Similarly, the second propulsion bus may include: electrical cables 42B connecting ESS 14B to distribution panel 22B, electrical cables 44A connecting distribution panel 22B to EPU 13A (e.g., to the electric motor of outboard nacelle 8A), and electrical cables 44D connecting distribution panel 22B to EPU 13D (e.g., to the electric motor of outboard nacelle 8D). Electric cables 44A-44D (collectively, "electric cables 44") and electric cables 42A and 42B (collectively, "electric cables 42") may be any type of electrical cable, such as stranded, solid, and the like. As shown in FIG. 2, electric cables 42 and 44 may be routed through wings 6A and 6B.

While described above and shown in FIGS. 1 and 2 as including four nacelles, the designs of this disclosure are equally applicable to aircraft that include other quantities of nacelles. As one example, an aircraft that included six nacelles may include three propulsion busses and three ESSs such that a failure of any single ESS does not result in asymmetric propulsion (e.g., a yaw moment). As another example, the designs of this disclosure are applicable to an aircraft with zero nacelles (e.g., with centerline or fuselage mounted propulsors).

Aircraft 2 may include one or more electric busses in addition to the propulsion busses. For instance, aircraft 2 may include one or more low voltage DC busses (e.g., 28 volts) that supply electrical energy to components of aircraft 2 other than propulsion motors (e.g., other than electrical motors 12). Some examples of components that may be powered via the low voltage DC busses include avionics and hotel loads (e.g., cabin lighting, cabin climate control, cooking, and the like). As shown in FIG. 2, aircraft 2 may include two non-propulsion electrical busses. Each of the non-propulsion electrical busses may include a battery, a distribution panel, and a control switch. For instance, a first non-propulsion electrical bus may include battery 38A, panel 36A, and control switch 26A. Similarly, a second non-propulsion electrical bus may include battery 38B, panel 36B, and control switch 26B. Panels 36A and 36B and batteries 38A and 38B may be included in nacelles. As shown in FIG. 2, panel 36A and battery 38A may be located in inboard nacelle 8B, and panel 36B and battery 38B may be located in inboard nacelle 8C. Control switches 26A and 26B may be located in fuselage 4 (e.g., in the cockpit). Activation of control switches 26 may result in activation (e.g., powering up) of the non-propulsion electrical busses, which may result in activation of the propulsion electrical busses. For instance, as shown in FIG. 2, ESS 14A may receive power from panel 36A and ESS 14B may receive power from panel 36B.

As shown in FIG. 2, inboard nacelles 8B and 8C may respectively include landing gear 40A and 40B. The presence of landing gear 40A and 40B in inboard nacelles 8B and 8C may reduce the space available for other components. As such, in accordance with one or more aspects of this disclosure, ESSs 14 may be included in outboard nacelles 8A and 8D. In this way, aircraft 2 may include nacelles of approximately the same size, which may improve aerodynamics and reduce manufacturing complexity.

In some examples, aircraft 2 may be a purely electrically powered aircraft. For instance, EPUs 13 may be entirely powered using electrical energy provided by ESSs 14. In other examples, aircraft 2 may be a hybrid-electric aircraft. For instance, aircraft 2 may include a combustion operated motor connected to a generator (e.g., a genset) that generates electrical energy for immediate use by EPUs 13 or for storage in ESSs 14.

Aircraft 2 may include a respective charging panel for each of the propulsion busses. For instance, as shown in FIG. 2, aircraft 2 may include charging panel 24A for the first propulsion bus and charging panel 24B for the second propulsion bus. Each of the charging panels may include components configured to enable the charging of an ESS of ESSs 14 using power sourced from outside of aircraft 2, such as ground power.

Figure 3:
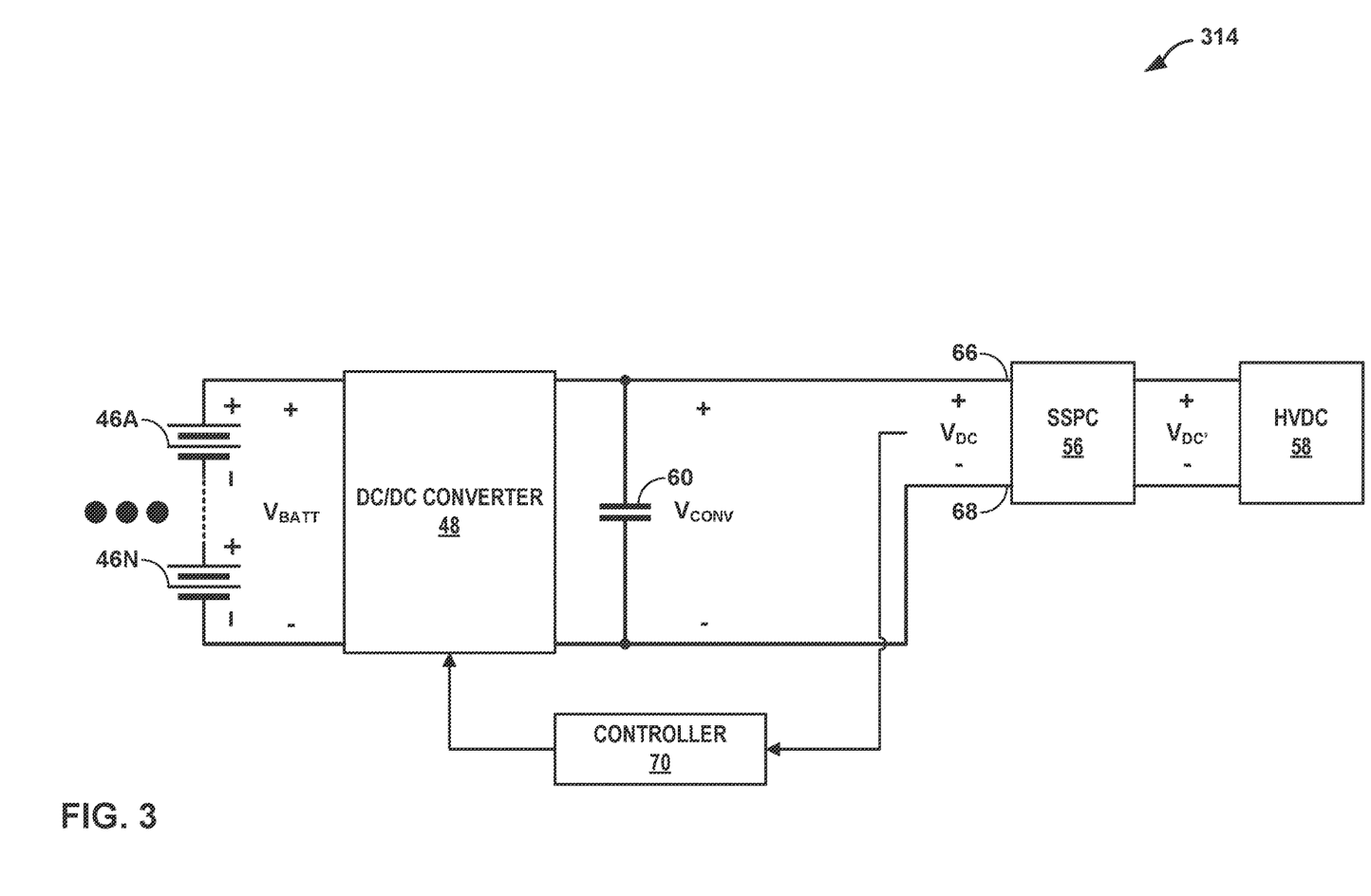

FIG. 3 is a schematic diagram of an electrical energy storage system having a fully rated converter. ESS 314 of FIG. 3 may be an example of an ESS of ESSs 14 of FIG. 1 or FIG. 2. As shown in FIG. 3, ESS 314 may include battery modules 46A-46N (collectively, "battery modules 46"), DC/DC converter 48, output capacitor 60, solid state power controller (SSPC) 56, high voltage DC (HVDC) bus 58, and controller 70.

Battery modules 46 may be configured to store electrical energy. Battery modules 46 may each contain one or more battery cells. The battery cells in battery modules 46 may be any type of battery cell. Examples of battery cells include, but are not limited to, lithium-ion, lead-acid, nickel-cadmium, nickel-metal hydride, lithium-ion polymer, or any other type of rechargeable battery (i.e., secondary cell). As shown in FIG. 3, battery modules 46 may be connected in series with voltage $V_{BATT}$ representing a combined voltage across battery modules 46.

DC/DC converter 48 may be configured to convert electrical energy between a voltage of battery modules 46 (e.g., $V_{BATT}$) and a specified output voltage level (e.g., $V_{CONV}$) of the first electrical bus. DC/DC converter 48 may be bi-directional in that DC/DC converter 48 may convert electrical energy provided by battery modules 46 for use by other components of aircraft 2 and convert electrical energy provided by other components of aircraft 2 for use in charging/discharging battery modules 48. In some examples, ESS 314 may include output capacitor 60, which may be configured to smooth an output of DC/DC converter 48. As shown in FIG. 3, DC/DC converter 48 may source electrical energy from battery modules 46. Outputs of DC/DC converter 48 may be connected to upper node 66 and lower node 68 (e.g., the voltage across which may be $V_{DC}$).

SSPC 56 be configured to distribute power to and protect various electrical loads. For instance, SSPC 56 may enable connection and disconnection of DC/DC converter 48 from HVDC bus 58, and/or may provide pre charging functionality.

In one example, SSPC 56 may be fully rated and/or operate in accordance with the SSPC described in U.S. patent Ser. No. 10/693,367B1, the entirety of which is hereby incorporated by reference in its entirety. As shown in FIG. 3, an input to SSPC 56 has voltage $V_{DC}$ and an output from SSPC 56 has voltage $V_{DC'}$. In general, $V_{DC}$ may be generally equal to $V_{DC'}$. In some examples, SSPC 56 may be omitted or replaced with other protection devices such as contactors, hybrid breakers, etc.

HVDC bus 58 include components configured to transfer electrical energy between ESS 314 and other components. For instance, HVDC bus 58 may be an example of PnD 20. As one specific example, HVDC bus 58 may be a 1080 volt DC bus.

Controller 70 may control operation of one or more components of ESS 314. For instance, controller 70 may sense an output voltage level (e.g., $V_{DC}$) and control operation of DC/DC converter 48 to regulate the output voltage level at a specified output voltage level. For instance, where DC/DC converter 48 includes switches, controller 70 may control operation of the switches to adjust the output voltage of DC/DC converter 48 (e.g., $V_{CONV}$) up or down.

Controller 70 may comprise any suitable arrangement of hardware, software, firmware, or any combination thereof, to perform the techniques attributed to controller 70 herein. Examples of controller 70 include any one or more microprocessors, digital signal processors (DSPs), application specific integrated circuits (ASICs), field programmable gate arrays (FPGAs), or any other equivalent integrated or discrete logic circuitry, as well as any combinations of such components. When controller 70 includes software or firmware, controller 70 further includes any necessary hardware for storing and executing the software or firmware, such as one or more processors or processing units. Although not shown, controller 70 may include a memory configured to store data. The memory may include any volatile or non-volatile media, such as a random access memory (RAM), read only memory (ROM), non-volatile RAM (NVRAM), electrically erasable programmable ROM (EEPROM), flash memory, and the like. In some examples, the memory may be external to controller 70 (e.g., may be external to a package in which controller 70 is housed).

In operation, voltage output of battery modules 46 may reduce as battery modules 46 discharge (e.g., reduce state of charge). Controller 70 may cause DC/DC converter 48 to compensate for this voltage drop such that the output voltage level remains at a specified output voltage.

In the example of FIG. 3, DC/DC converter 48 may be considered to be a fully rated converter. For instance, DC/DC converter 48 may be rated (e.g., capable of without adverse impact) to bridge a voltage difference between battery modules 46 and HVDC bus 58 regardless of a state of charge or voltage of battery modules 46. In other words, DC/DC converter 48 may be configured to tolerate a fully range of levels of $V_{DC}$. As one specific example, where $V_{DC}$ may reach 1080 volts, DC/DC converter 48 may be rated to output 1080 volts. As discussed above, increases in rated capability of DC/DC converters are positively correlated with size and/or weight of DC/DC converters.

In accordance with one or more aspects of this disclosure, an ESS may include a partially rated DC/DC converter. FIGS. 4A-4F are schematic diagrams illustrating examples of electrical energy storage systems having one or more partially rated converters, in accordance with one or more aspects of this disclosure. Each of ESSs 414A-414F (collectively, "ESSs 414") illustrated in FIGS. 4A-4F may be an example of an ESS of ESSs 14 of FIG. 1 or FIG. 2. SSPC 56 and HVDC 58 of FIGS. 4A-4F may be examples of SSPC 56 and HVDC 58 of FIG. 3.

As shown in FIGS. 4A-4F, each of ESSs 414 may include multiple sets of battery modules that are connected in series. For instance, each of ESSs 414 may include first set of battery modules 50A-50N (collectively, "battery modules 50") that are connected in series, and second set of battery modules 52A-52N (collectively, "battery modules 52") that are connected in series. It is understood that each of battery modules 50 and battery modules 52 may include one or more battery modules (e.g., the first set of battery modules may include one or more battery modules, and the second set of battery modules may include one or more battery modules). Additionally, each of battery modules 50 may include one or more battery cells that may be arranged in any series/parallel combination. As one example, a particular battery module of battery modules 50 or battery modules 52 may include 84 cells in series and 5 in parallel (i.e., 84S5P). Where battery modules 50 includes three of these battery modules connected in series, the output (e.g., $V_{BATT\_A}$) may be between 630 volts and 1058.4 volts. Where battery modules 52 includes one of these battery modules, the output (e.g., $V_{BATT\_B}$) may be between 210 volts and 352.8 volts. As another example, a particular battery module of battery modules 50 or battery modules 52 may include battery cells in a 60S7P arrangement. In some examples, battery modules 50 may be configured such that, when at a full state of charge, a voltage of battery modules 50 is less than or equal to a specified output voltage level. For instance, where the specified output voltage level ($V_{DC}$ target) is 1080 volts, a voltage of battery modules 50 ($V_{BATT\_A}$) may be less than or equal to 1080 volts.

As discussed above, each of ESSs 414 may include a partially rated DC/DC converter, such as DC/DC converter 54. DC/DC converter 54 may be configured to perform operations similar to DC/DC converter 48 of FIG. 3. However, as shown in FIGS. 4A-4F, DC/DC converter 54 may source electrical energy from battery modules 52 (e.g., the second set of battery modules) and an output of DC/DC converter 54 may be electrically in series with battery modules 50 (e.g., the first set of battery modules) such that the output voltage of an ESS of ESSs 414 (e.g., $V_{DC}$) is greater than an output voltage of DC/DC converter 54 (e.g., $V_{CONV}$) In particular, in the examples of FIGS. 4A and 4B, output voltage level $V_{DC}$ may equal $V_{BATT\_A}$ plus $V_{CONV}$. As such, DC/DC converter 54 may have a voltage rating that is less than a voltage across upper node 66 and lower node 68.

In operation, voltage outputs of battery modules 50 and battery modules 52 may reduce as battery modules 50 and 52 discharge. While the voltage contribution of battery modules 50 may be uncontrolled, controller 70 may cause DC/DC converter 54 to compensate for voltage drops such that the output voltage level remains at a specified output voltage. For instance, controller 70 may cause DC/DC converter 54 to increase its output voltage level (e.g., $V_{CONV}$) as a state of charge of battery modules 50 decreases. As such, DC/DC converter 54 may increase an amount of power sourced from battery modules 52 as a state of charge of battery modules 50 decreases. In this way, controller 70 may maintain a voltage across upper node 66 and lower node 68 at a specified output voltage level (e.g., without controlling a voltage contribution of battery modules 50).

In some scenarios, such as where a combined voltage of battery modules 50 and 52 at full state of charge is greater than the specified output voltage level, DC/DC converter 54 may transition operation between one or more of: a voltage reduction mode (e.g., a buck mode in which $V_{CONV}$ is less than $V_{BATT\_B}$), a pass-through mode (e.g., in which $V_{CONV}$ is approximately equal to $V_{BATT\_B}$), and a voltage increase mode (e.g., a boost mode in which $V_{CONV}$ is greater than $V_{BATT\_B}$). Controller 70 may cause DC/DC converter 54 to operate in the buck mode where a state of charge of battery modules 50 is greater than a first threshold state of charge, operate in the boost mode where the state of charge of battery modules 50 is less than a second threshold state of charge, and/or operate in the pass-through mode where the state of charge of battery modules 50 is between the first threshold state of charge and the second threshold state of charge. In some examples, the pass-through mode may be omitted (e.g., where the first threshold state of charge is the same as the second threshold state of charge). Similarly, controller 70 may cause DC/DC converter 54 to operate in the buck mode responsive to a combined voltage of battery modules 50 and battery modules 52 being greater than the specified output voltage, operate in the boost mode responsive to the combined voltage of battery modules 50 and battery modules 52 being less than the specified output voltage, and operate in the pass-through mode responsive to the combined voltage of battery modules 50 and battery modules 52 being equal to the specified output voltage.

Figure 4A:
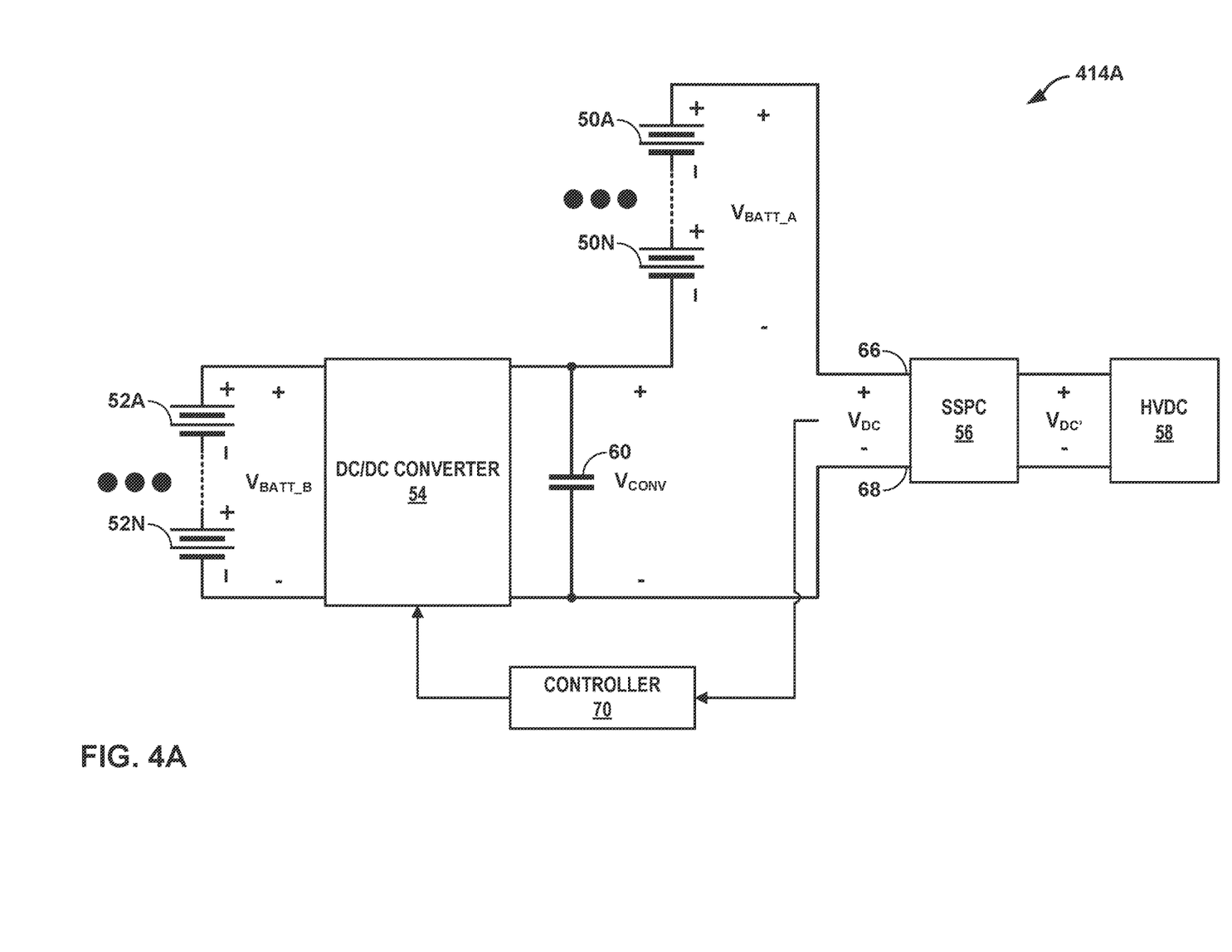
FIGS. 4A-4F are schematic diagrams illustrating examples of electrical energy storage systems having one or more partially rated converters, in accordance with one or more aspects of this disclosure.
Figure 4B:
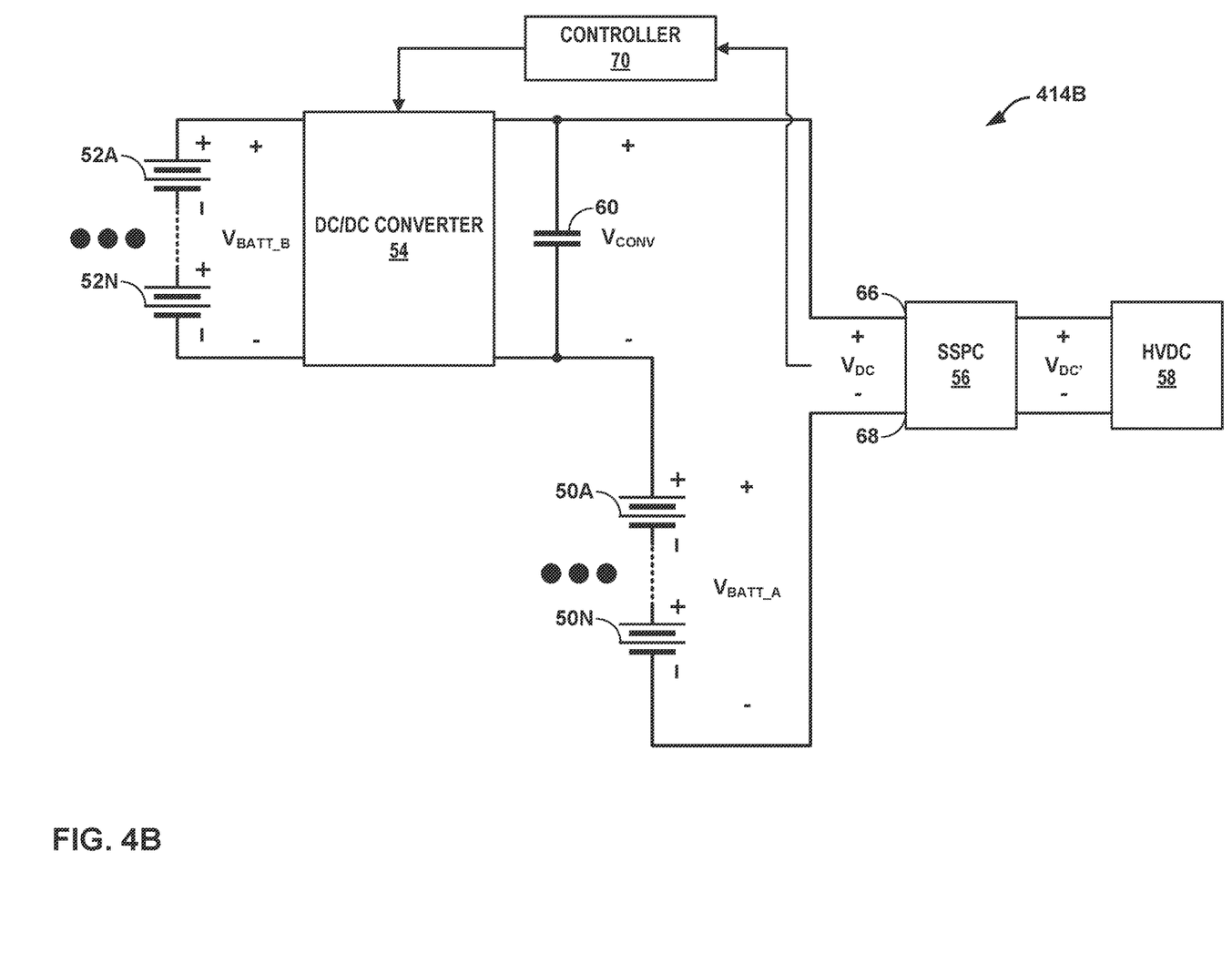
Figure 4C:
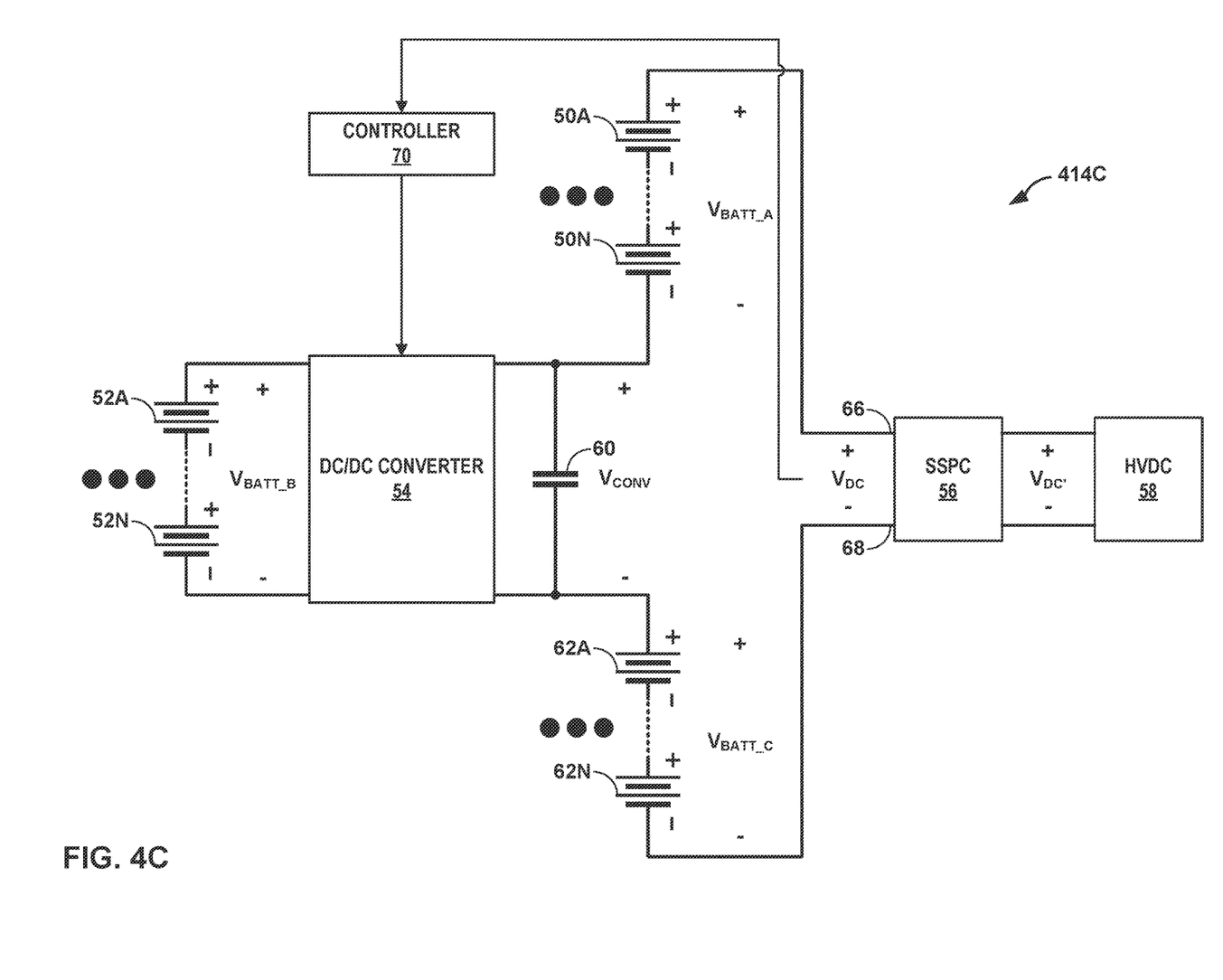
Figure 4D:
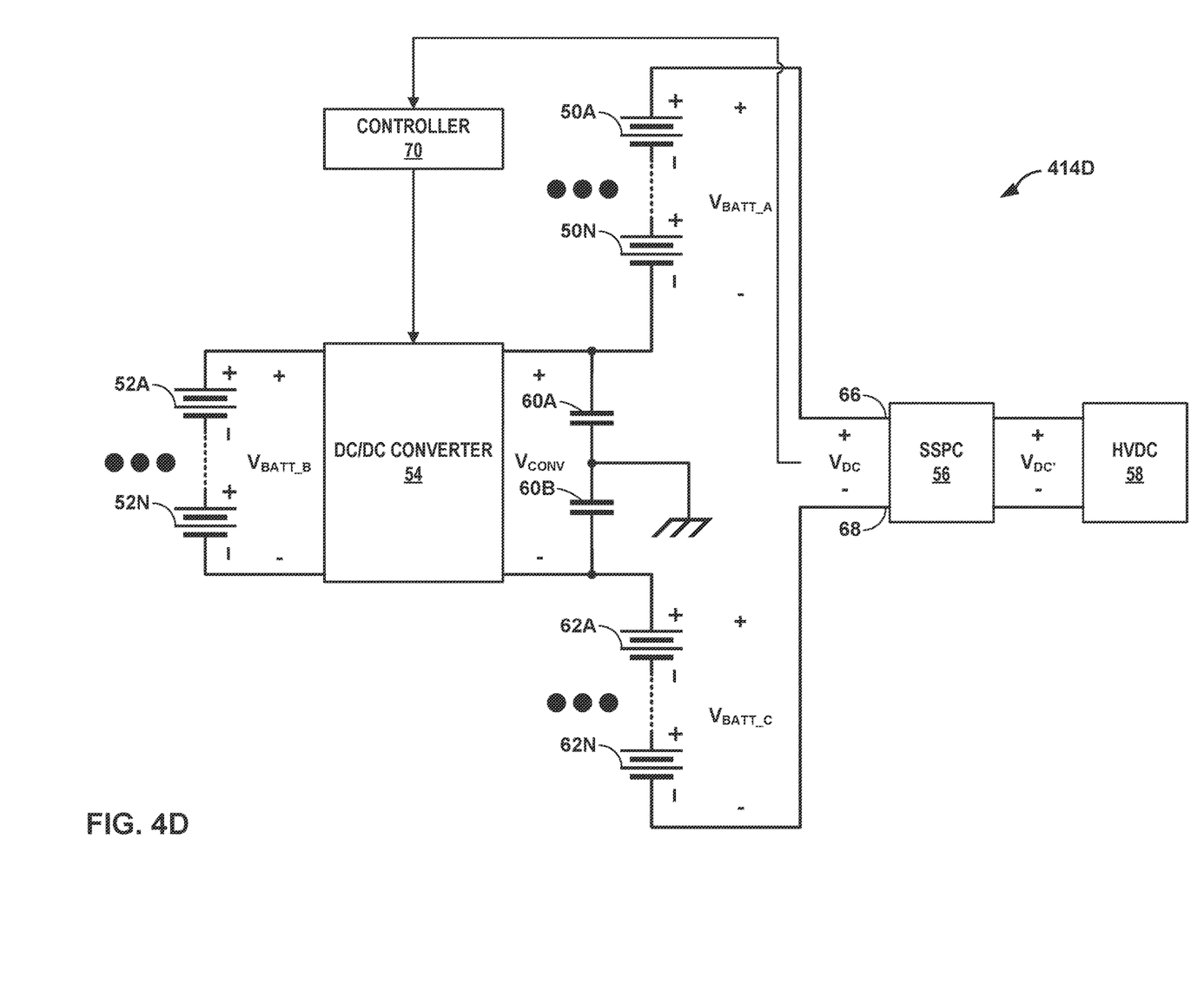

As can be seen in FIGS. 4A-4D, the partially rated converter (e.g., DC/DC converter 54) may be placed in various positions to allow for different grounding schemes. FIG. 4A illustrates an example where the partially rated converter is at a negative rail, FIG. 4C illustrates an example where the partially rated converter is a positive rail, FIG. 4C illustrates an example where the partially rated converter is neither at the positive rail or the negative rail, and FIG. 4D illustrates an example where the partially rated converter is at a neural point (e.g., a solidly or high impedance ground). As shown in FIG. 4D, ESS 414D may include a chassis ground at an electrical midpoint of DC/DC converter 54. In some examples, the ground connection at the electrical midpoint of DC/DC converter 54 may be a high impedance ground.

As can be seen in the examples of FIGS. 4C and 4D, ESSs 414C and 414D may include a third set of battery modules 62A-62N (collectively, "battery modules 62") that are connected in series. Battery modules 62 may be in series with battery modules 50 (e.g., the first set of battery modules) and DC/DC converter 54. As such the output voltage $V_{DC}$ may be a sum of $V_{BATT\_A}$, $V_{CONV}$, and $V_{BATT\_C}$. In such examples, controller 70 may similarly control operation of DC/DC converter 54 to compensate for changes in $V_{BATT\_A}$ and $V_{BATT\_C}$ by adjusting $V_{CONV}$. As shown in FIGS. 4C and 4D, DC/DC converter 54 may be in series between battery modules 50 and battery modules 62.

In some examples, it may be advantageous for DC/DC converter 54 to be located near the system chassis ground, such as to reduce the insulation stress on its components that interface with the high voltage. Batteries and BMS systems may be designed to handle this insulation stress indefinitely but DC/DC converters may not be designed to handle this insulation stress indefinitely. Note that in certain failure cases, such as where a ground fault occurs somewhere in the battery modules or in the HVDC bus 58, DC/DC converter 54 may still have to float. However, it may be simpler to design for a few hours of operation during a fault rather than a continuous voltage stress over the life of the system.

Figure 4E:
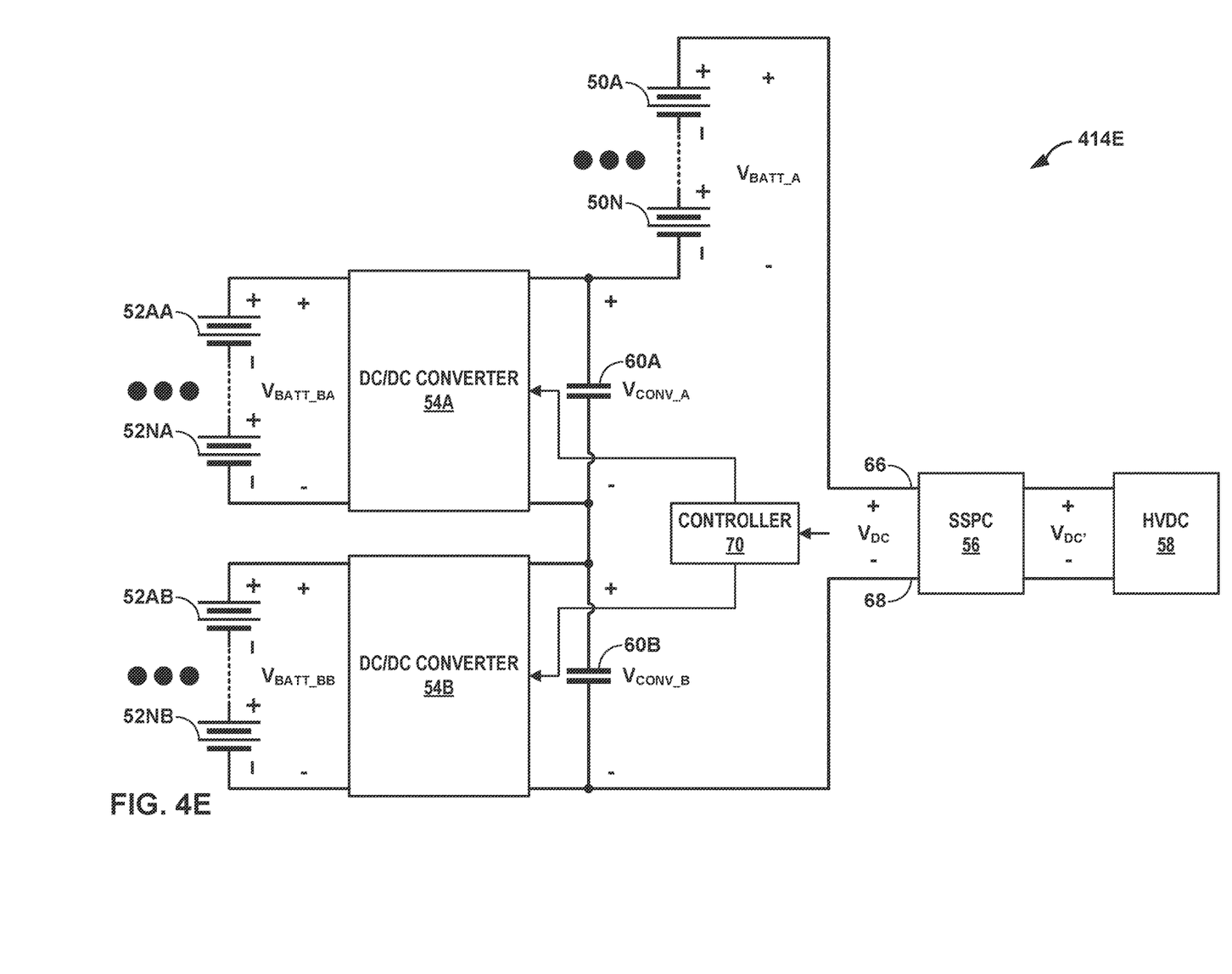
Figure 4F:
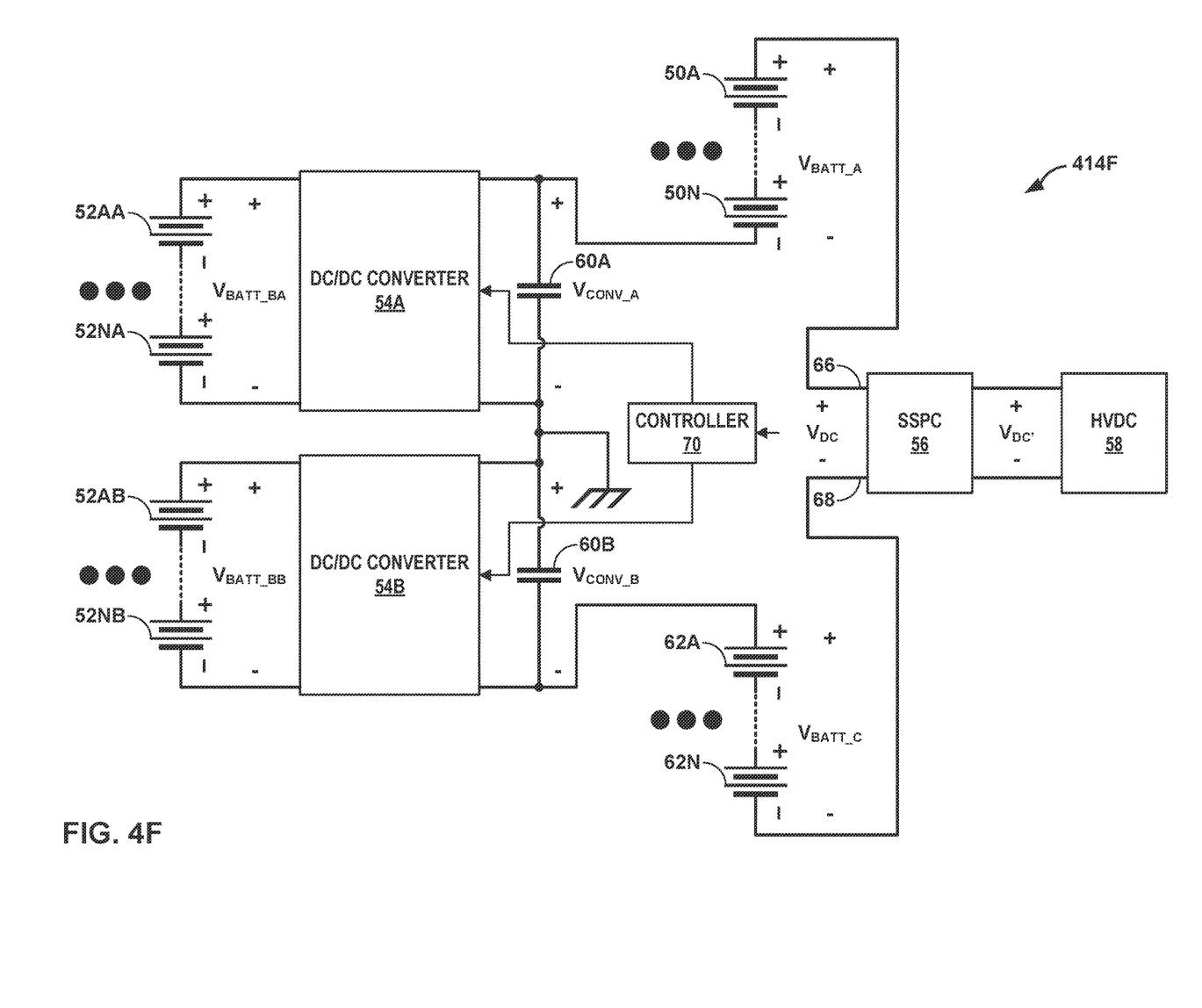

While discussed above as including a single partially rated converter, the techniques of this disclosure are not so limited. For instance, as shown in FIGS. 4E and 4F, ESSs 414E and 414F may include a plurality of DC/DC converters 54A and 54B (collectively, "DC/DC converters 54"). Each of DC/DC converters 54 may source power from a respective set of battery modules. For instance, DC/DC converter 54A may source power from battery modules 52AA-52NA, and DC/DC converter 54B may source power from battery modules 52AB-52NB (e.g., a fourth set of battery modules).

This configuration may be particularly desirable when the output voltage ($V_{DC}$) is much higher e.g., 1.5 kV or 3 kV. Also, this configuration may be desirable for applications where the output voltage ($V_{DC}$) is ±270V or ±540V or ±1.5 kV with asymmetrical loading. Where having two DC/DC converters can help to maintain the balancing on the output voltage despite unbalance loading or different state of charge of the battery modules.

In some examples, all battery modules of an ESS may be a same battery type. As one example, battery modules 50, 52AA-52NA, and 52AB-52NB may be a same battery type (e.g., have a same battery chemistry and/or charging/discharging rate (C-rate)). As another example, battery modules 50, 52AA-52NA, and 52AB-52NB may be a same battery type but may have different sizes/capacities. In some examples, some battery modules of an ESS may be different battery types. As one example, battery modules 50 may be a different type than battery modules 52AA-52NA and 52AB-52NB. As another example, battery modules 52AA-52NA and 52AB-52NB may be different types of battery modules.

Other aspect of the proposed configuration is the its ability to mix different battery chemistries with different discharge capabilities and energy densities and different thermal management requirements. In some arrangements, all battery modules may be cooled with a same cooling system and charge/discharge at a same rate. As such, it may be desirable to use a same battery chemistry to enable charging/discharging and balancing functions.

However, when sets of battery modules are going to be charging/discharging at different rates by design, it may be desirable to mix battery types. For instance, in the example of FIG. 4E, battery modules 52AA-52NA may have a different charging rate than battery modules 52AN-52NB (e.g., battery modules 52AA-52NA may be a high C rate battery type while battery modules 52AN-52NB may be a high energy density low C rate battery type). As such, this disclosure enables use of multiple battery types to optimize overall ESS weight while delivering different aircraft mission requirements.

Additionally or alternatively, the use of multiple partially rated converters may provide advantages of mixing battery modules of different age (e.g., whether or not the same battery type). For instance, current electric aircraft typically use and track their ESS all as a unit, charging/discharging simultaneously and replacing the ESS cells at end of life all at once. The examples of FIGS. 4E and 4F may enable modules with different ages to be used together safely by adjusting the draw from older modules vs. younger modules. For instance, where battery modules 52AA-52NA are older than battery modules 52AB-52NB (e.g., and thus $V_{BATT\_BA}$ would be lower than $V_{BATT\_BB}$ when at maximum state of charge), the use of multiple DC/DC converters enables more efficient use (e.g., by drawing more power from the newer battery modules).

Figure 5:
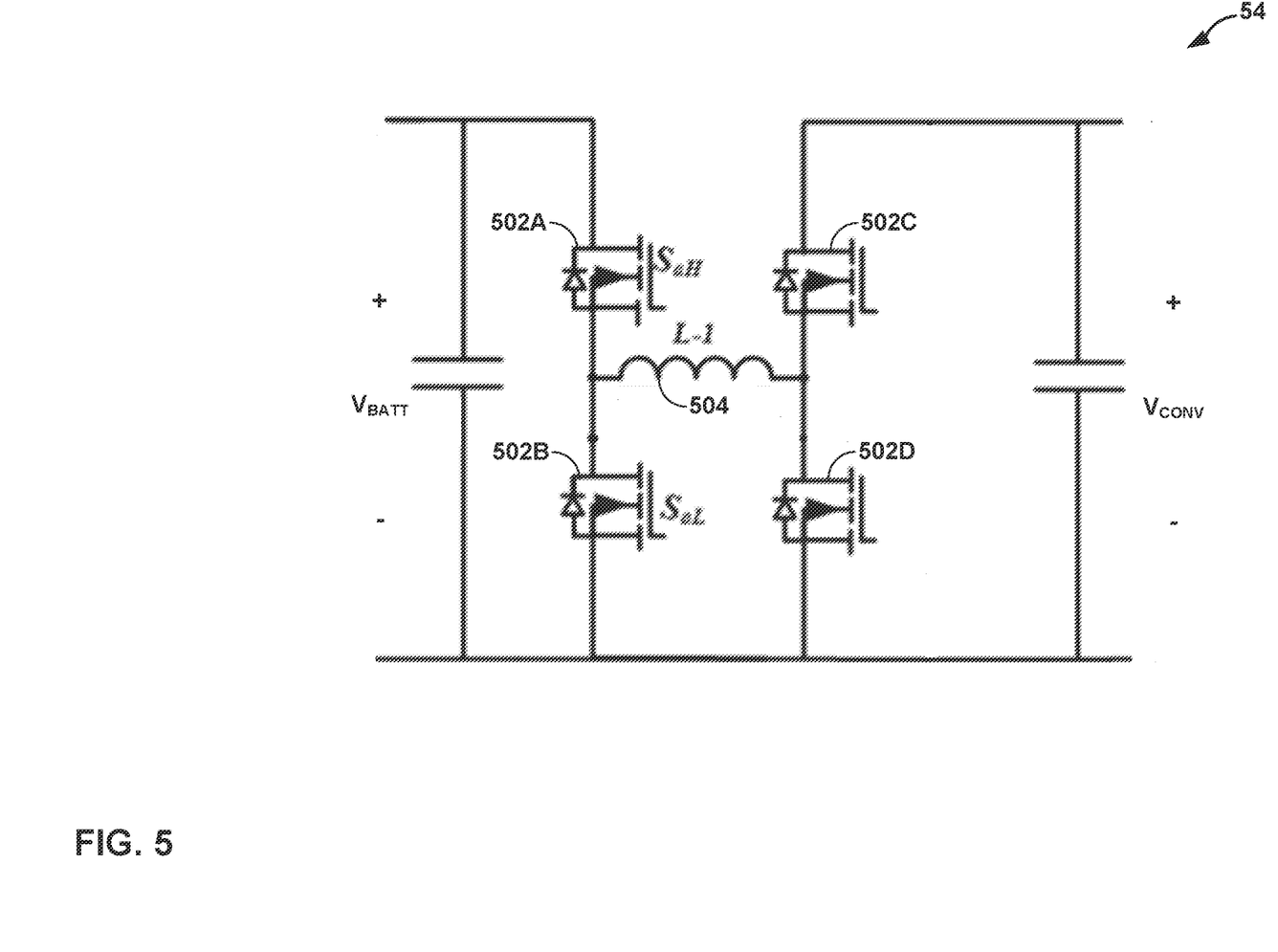
FIG. 5 is a schematic diagram of an example DC/DC converter, in accordance with one or more aspects of this disclosure.

FIG. 5 is a schematic diagram of an example DC/DC converter, in accordance with one or more aspects of this disclosure. As shown in FIG. 5, DC/DC converter 54 may include a plurality of switches 502A-502D (collectively, "switches 502"). Switches 502 may be any type of switch, such as semiconductor switches. For instance, switches 502 may be wide bandgap devices such as GaN or SIC MOSFETs. By utilizing wide bandgap devices for switches 502, weight savings in size of inductor and capacitors due to high switching frequency operation can be achieved. Switches 502 may be arranged in an H-bridge, with switches 502A and 502B forming a low or battery voltage side half H-bridge and switches 502C and 502D forming a high voltage side half H-bridge. The high voltage side and the low voltage side may be connected with inductor 504, thereby enabling converter 54 to operate in both buck mode and boost operating modes. When operating in the buck mode, pulse width modulation (PWM) signals may be applied (e.g., via controller 70) to battery-side switches 502A and 502B. When operating in the boost mode, PWM signals may be applied (e.g., via controller 70) to high voltage side switches 502C and 502D. Alternatively, when operating in the pass-through mode, switches 502A and 502C may be closed while switches 502B and 502D are open.

Figure 6:
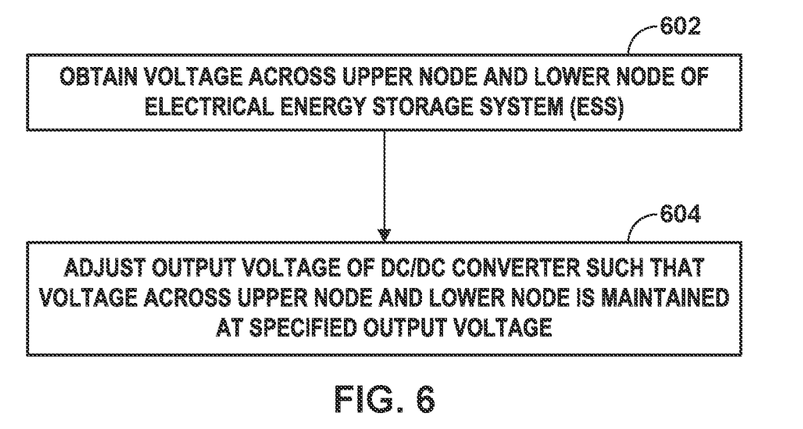
FIG. 6 is a flowchart illustrating an example technique for operating a partially rated converter, in accordance with one or more aspects of this disclosure.

FIG. 6 is a flowchart illustrating an example technique for operating a partially rated converter, in accordance with one or more aspects of this disclosure. The technique of FIG. 6 may be performed by a controller of an electrical energy storage system, such as controller 70 of ESS 314, however other controllers may perform the technique of FIG. 6.

Controller 70 may obtain a voltage across an upper node and a lower node of an ESS (602). For instance, controller 70 may obtain a voltage across upper node 66 and lower node 68. As discussed above with reference to the example of FIG. 4A, the voltage across upper node 66 and lower node 68 may be a sum of the output voltage of DC/DC converter 54 and first set of battery modules 50.

Controller 70 may adjust an output voltage of a DC/DC converter such that the voltage across the upper node and the lower node is maintained at a specified output voltage level (602). For instance, where the voltage across the upper node and the lower node is greater than the specified output voltage, controller 70 may cause a reduction in the output voltage of DC/DC converter 54. Similarly, where the voltage across the upper node and the lower node is less than the specified output voltage, controller 70 may cause an increase in the output voltage of DC/DC converter 54. Further details of example adjustments are discussed below with reference to FIG. 7.

Figure 7:
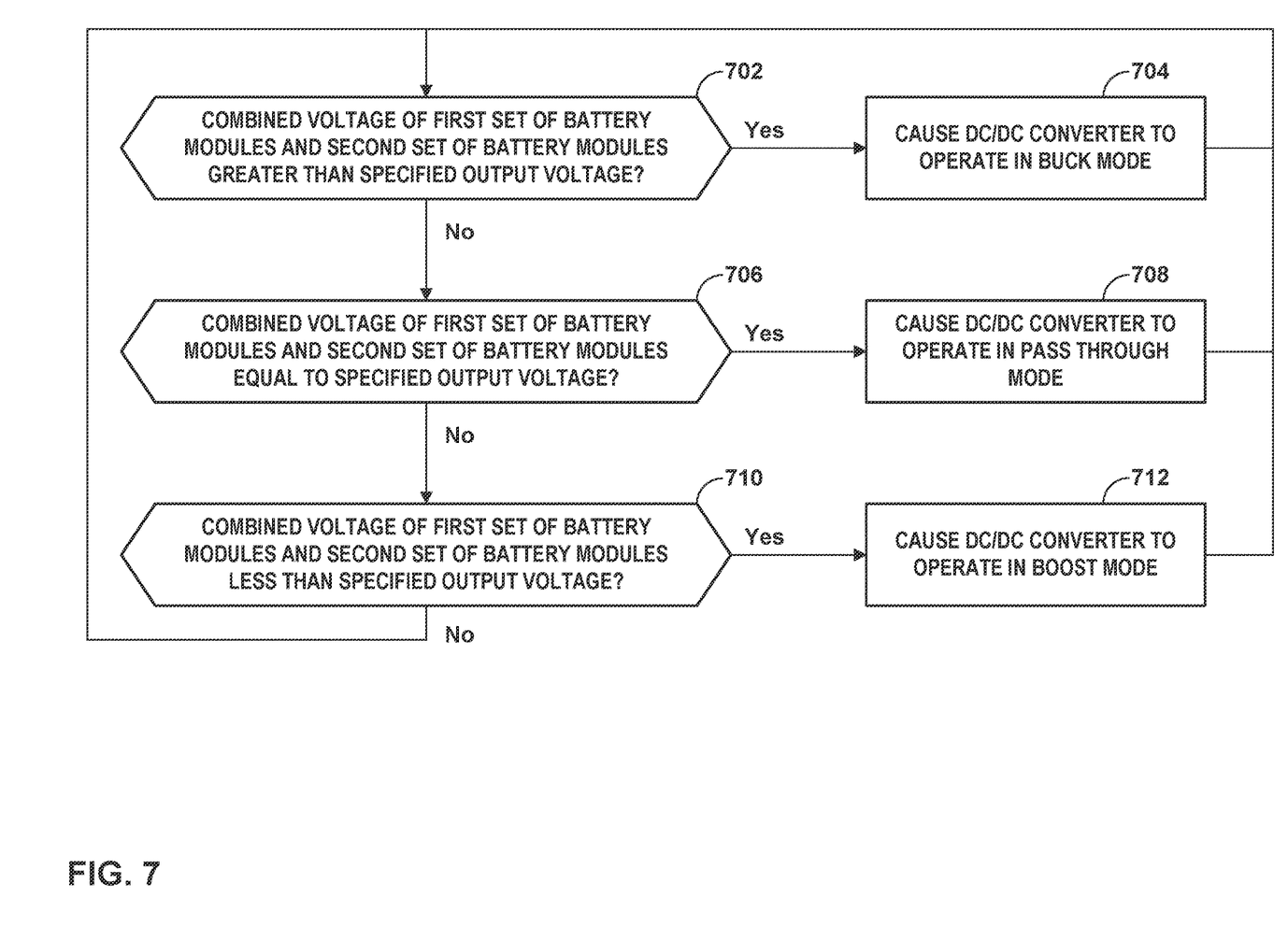
FIG. 7 is a flowchart illustrating an example technique for operating a partially rated converter, in accordance with one or more aspects of this disclosure.

FIG. 7 is a flowchart illustrating an example technique for operating a partially rated converter, in accordance with one or more aspects of this disclosure. The technique of FIG. 7 may be performed by a controller of an electrical energy storage system, such as controller 70 of ESS 314, however other controllers may perform the technique of FIG. 7.

Controller 70 may determine whether the combined voltage of a first set of battery modules and a second set of battery modules is greater than a specified output voltage (702). For instance, controller 70 may determine whether a combined voltage across battery modules 50 and battery modules 52 is greater than the specified output voltage.

Responsive to determining that the combined voltage of the first set of battery modules and the second set of battery modules is greater than the specified output voltage ("Yes" branch of 702), controller 70 may cause a DC/DC converter to operate in a buck mode (704). For instance, controller 70 may cause DC/DC converter 54 to generate $V_{Conv}$ with a lower voltage than $V_{Batt\_B}$.

Controller 70 may determine whether the combined voltage of the first set of battery modules and the second set of battery modules is equal (e.g., substantially equal) to the specified output voltage (706). For instance, controller 70 may determine whether the combined voltage across battery modules 50 and battery modules 52 is equal to the specified output voltage.

Responsive to determining that the combined voltage of the first set of battery modules and the second set of battery modules is equal to the specified output voltage ("Yes" branch of 706), controller 70 may cause a DC/DC converter to operate in a pass-through mode (708). For instance, controller 70 may cause DC/DC converter 54 to generate $V_{Conv}$ with a same voltage as $V_{Batt\_B}$.

Controller 70 may determine whether the combined voltage of the first set of battery modules and the second set of battery modules is less than the specified output voltage (706). For instance, controller 70 may determine whether the combined voltage across battery modules 50 and battery modules 52 is less than the specified output voltage.

Responsive to determining that the combined voltage of the first set of battery modules and the second set of battery modules is less than the specified output voltage ("Yes" branch of 710), controller 70 may cause a DC/DC converter to operate in a boost mode (712). For instance, controller 70 may cause DC/DC converter 54 to generate $V_{Conv}$ with a greater voltage than $V_{Batt\_B}$.

Various examples have been described. These and other examples are within the scope of the following claims.

What is claimed is:

1. A system comprising:
    an electrical energy storage system (ESS) comprising:
        an upper node and a lower node;
        a first set of battery modules that are connected in series;
        a second set of battery modules that are connected in series; and
        a DC/DC converter electrically in series with the first set of battery modules between the upper node and the lower node, wherein the DC/DC converter sources electrical energy from the second set of battery modules; and
    a controller configured to adjust an output voltage of the DC/DC converter such that a voltage across the upper node and the lower node is maintained at a specified output voltage level.

2. The system of claim 1, wherein, when at a full state of charge, a voltage of the first set of battery modules is less than or equal to the specified output voltage level.

3. The system of claim 1, wherein the DC/DC converter has a voltage rating that is less than the voltage across the upper node and the lower node.

4. The system of claim 1, wherein, to adjust the output voltage of the DC/DC converter, the controller is configured to cause the DC/DC converter to increase an amount of power sourced from the second set of battery modules as a state of charge of the first set of battery modules decreases.

5. The system of claim 1, wherein, to adjust the output voltage of the DC/DC converter, the controller is configured to cause the DC/DC converter to:

operate in a buck mode where a state of charge of the first set of battery modules is greater than a first threshold state of charge; and operate in a boost mode where the state of charge of the first set of battery modules is less than a second threshold state of charge.

6. The system of claim 1, wherein, to adjust the output voltage of the DC/DC converter, the controller is configured to cause the DC/DC converter to:

operate in a buck mode responsive to a combined voltage of the first set of battery modules and the second set of battery modules being greater than the specified output voltage; and operate in a boost mode responsive to the combined voltage of the first set of battery modules and the second set of battery modules being less than the specified output voltage.

7. The system of claim 6, wherein, to adjust the output voltage of the DC/DC converter, the controller is configured to cause the DC/DC converter to:

operate in a pass-through mode responsive to the combined voltage of the first set of battery modules and the second set of battery modules being equal to the specified output voltage.

8. The system of claim 1, further comprising:

a third set of battery modules that are connected in series, wherein the third set of battery modules is in series with the first set of battery modules and the DC/DC converter.

9. The system of claim 8, wherein the DC/DC converter is in series between the first set of battery modules and the third set of battery modules.

10. The system of claim 9, further comprising:

a chassis ground connection at an electrical midpoint of the DC/DC converter.

11. The system of claim 1, wherein the DC/DC converter is a first DC/DC converter, the system further comprising:

a fourth set of battery modules; and a second DC/DC converter electrically in series with the first set of battery modules and the first DC/DC converter, wherein the second DC/DC converter sources electrical energy from the fourth set of battery modules, wherein the controller is configured to adjust output voltages of the first DC/DC converter and the second DC/DC converter such that the voltage across the upper node and the lower node is maintained at the specified output voltage level.

12. The system of claim 11, wherein a battery type of the second set of battery modules is different than a battery type of the fourth set of battery modules.

13. The system of claim 12, wherein the second set of battery modules have a faster discharge rate than the fourth set of battery modules.

14. The system of claim 1, wherein the ESS is included in an aircraft that includes one or more electrical motors configured to provide propulsion to the aircraft using electrical energy sourced from the ESS.

15. The system of claim 14, further comprising:

a solid-state power controller (SSPC) connected to the upper node and the lower node, the SSPC configured to interface between the ESS and a high voltage DC electrical bus.

16. A method comprising:

obtain, by a controller of an electrical energy storage system (ESS), a voltage across an upper node and a lower node of the ESS, wherein the ESS includes:

a first set of battery modules that are connected in series;

a second set of battery modules that are connected in series; and a DC/DC converter electrically in series with the first set of battery modules between the upper node and the lower node, wherein the DC/DC converter sources electrical energy from the second set of battery modules; and adjust, by the controller, an output voltage of the DC/DC converter such that the voltage across the upper node and the lower node is maintained at a specified output voltage level.

17. The method of claim 16, wherein adjusting the output voltage of the DC/DC converter comprises:

causing the DC/DC converter to operate in a buck mode where a state of charge of the first set of battery modules is greater than a first threshold state of charge; and causing the DC/DC converter to operate in a boost mode where the state of charge of the first set of battery modules is less than a second threshold state of charge.

18. The method of claim 16, wherein adjusting the output voltage of the DC/DC converter comprises:

causing the DC/DC converter to operate in a buck mode responsive to a combined voltage of the first set of battery modules and the second set of battery modules being greater than the specified output voltage; and causing the DC/DC converter to operate in a boost mode responsive to the combined voltage of the first set of battery modules and the second set of battery modules being less than the specified output voltage.

19. The method of claim 18, wherein adjusting the output voltage of the DC/DC converter comprises:

causing the DC/DC converter to operate in a pass-through mode responsive to the combined voltage of the first set of battery modules and the second set of battery modules being equal to the specified output voltage.

20. The method of claim 16, wherein the DC/DC converter is a first DC/DC converter, and wherein adjusting the output voltage comprises:

adjusting output voltages of the first DC/DC converter and a second DC/DC converter such that the voltage across the upper node and the lower node is maintained at the specified output voltage level, wherein the second DC/DC converter is electrically in series with the first set of battery modules and the first DC/DC converter, and wherein the second DC/DC converter sources electrical energy from the fourth set of battery modules.

* * * * *